SHIFT REGISTER

Filed Nov. 21, 1963

INVENTORS.
JAMES R. BACON
GEORGE H. BARNES
BY
Vincent L. Carney
ATTORNEY 3,289,010
SHIFT REGISTER
James R. Bacon, Philadelphia, and George H. Barnes, West Chester, Pa., assignors to Burroughs Corporation, Detroit, Mich., a corporation of Michigan
Filed Nov. 21, 1963, Ser. No. 325,295
8 Claims. (Cl. 307—88.5)

This invention relates to pulse handling circuits and more particularly, relates to shift registers.

Shift registers have wide application in the electronic arts, especially in the field of electronic computers. They have a variety of different uses such as the conversion of serial information to parallel information, the temporary storage of information, the temporary delay of voltage pulses, and the counting of voltage pulses.

In many applications it is necesary for the shift registers to operate quickly and accurately. However, since the shift register is made up of several stages, it is desirable for each stage to be as simple as possible. To accomplish this, an uncomplicated circuit utilizing only simple and inexpensive components is necessary. Accordingly, it is an object of this invention to provide an improved shift register.

It is a further object of this invention to provide a rapidly operating shift register composed entirely of capacitors, diodes, resistors, and transistors.

It is a still further object of this invention to provide a shift register which advances only on shift pulses having polarity opposite that of the preceding pulse.

In accordance with the above objects a shift register is provided in which voltages are stored on a series of capacitors. Charge is transferred from one capacitor to the other through transistors which form a connection between each capacitor and the succeeding capacitor. Complementary transistors are used in intermediate stages so that charge is provided to a particular capacitor by a PNP transistor and away from it to the next capacitor by a NPN transistor. If charge is shifted to a capacitor by a voltage of one polarity, it is shifted away from the same capacitor to the next capacitor by a voltage pulse of the opposite polarity.

The invention and the above noted and other features thereof will be understood more clearly and fully from the following detailed description with reference to the accompanying drawings in which.

Figure 1:
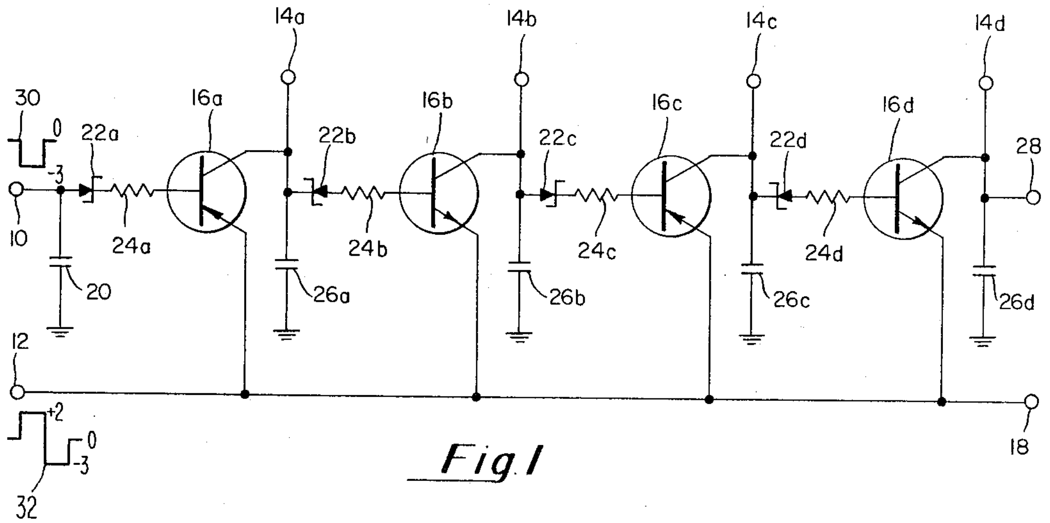
FIGURE 1 is a schematic circuit diagram of one embodiment of the invention.

With reference to FIGURE 1 there is shown a schematic circuit diagram of a shift register having a signal input terminal 10, a shift pulse (advance pulse or clock pulse) input terminal 12, and four output terminals 14*a*, 14*b*, 14*c* and 14*d*. The shift pulse terminal 12 is electrically connected to the emitter of PNP transistor 16*a*, to the emitter NPN transistor 16*b*, to the emitter of PNP transistor 16*c*, to the emitter of NPN transistor 16*d*, and to terminal 18.

The input terminal 10 is electrically connected to one plate of capacitor 20 and to the anode of Zener diode 22*a*; the other plate of capacitor 20 is grounded. The resistor 24*a* electrically connects the cathode of the Zener diode 22*a* to the base of the transistor 16*a*.

The collector of the transistor 16*a* is electrically connected to the output terminal 14*a*, to the cathode of the Zener diode 22*b* and to one plate of the capacitor 26*a*; the other plate of the capacitor 26*a* is grounded. The resistor 24*b* electrically connects the anode of the Zener diode 22*b* to the base of transistor 16*b*.

The collector of the transistor 16*b* is electrically connected to the output terminal 14*b*, to the anode of the Zener diode 22*c*, and to one plate of the capacitor 26*b*; the other plate of the capacitor 26*b* is grounded. A resistor 24*c* electrically connects the cathode of the Zener diode 22*c* to the base of the transistor 16*c*.

The collector of the transistor 16*c* is electrically connected to the output terminal 14*c*, to the cathode of the Zener diode 22*d*, and to one plate of the capacitor 26*c*; the other plate of the capacitor 26*c* is grounded. A resistor 24*d* electrically connects the anode of the Zener diode 22*d* to the base of the transistor 16*d*.

The collector of the transistor 16*d* is electrically connected to the output terminal 14*d*, to terminal 28 and to one plate of the capacitor 26*d*; the other plate of capacitor 26*d* is grounded.

The PNP transistors 16*a* and 16*c* are of the type 2N135; the NPN transistors 16*b* and 16*d* are of the type 2N184. The input pulse applied to terminal 10 has an amplitude of a negative 3 volts, and the shift pulse 32 applied to terminal 12 has a maximum positive amplitude of a positive 2 volts and a maximum negative amplitude of a negative 3 volts. The capacitors each have a value of capacitance of 2200 picofarads and the resistors each have a value of resistance of 1000 ohms. Of course, further stages may be electrically connected to terminals 28 and 18 or a ring counter may be formed by electrically connecting terminal 28 to terminal 10.

An input voltage of a negative 3 volts, applied to terminal 10, is stored by capacitor 20. The transistor 16*a* does not conduct since the conducting path from its base to the capacitor 20 is blocked by the four volt Zener diode 22*a*. However, when the positive 2 volt portion of the shift voltage is applied to terminal 12 the Zener diode 22*a* conducts, drawing base current from the transistor 16*a* so as to render this transistor conducting. The emitter-to-collector current through the transistor 16*a* is stored by the capacitor 26*a* as a positive voltage pulse. This voltage appears at output terminal 14*a* and is considered part of the same bit. It is merely an intermediate portion of the first stage of the shift register.

The positive voltage now on capacitor 26*a* does not cause the transistor 16*b* to conduct since the current path from the capacitor 26*a* to the base of the transistor 16*b* is blocked by the Zener diode 22*b*. However, the second portion of the shift pulse, which is a negative three volts, forces the Zener diode 22*b* to conduct, causing current to flow from the capacitor 26*a* through the base-to-emitter junction of the transistor 16*b* switching this transistor into conduction. The collector-to-emitter current of the transistor 16*b* charges the capacitor 26*b* to a negative 3 volts. This voltage appears at terminal 14*b* which is normally considered the first position from the input terminal 10. It may read out through a high impedance.

In a similar manner the next positive portion of the next shift voltage pulse will cause the Zener diode 22*c* to conduct, turning on the transistor 16*c* and charging the capacitor 26*c* to a positive voltage. The negative portion of this shift pulse will in turn cause the Zener diode 22*d* to conduct, turning on the transistor 16*d* so as to charge the capacitor 26*d* to a negative potential which is indicated at output terminal 14*d*. The output at 14*d* is the second stage of the shift register. The inverted, intermediate voltages at terminals 14*a* and 14*c* may be utilized if desired. On the other hand, if a potential near ground level exists on terminal 10 at the time that the voltage shift pulse is applied to the terminal 12 the Zener diode 22*a* will not conduct, the transistor 16*a* will not be turned on, and the capacitor 26*a* will not be charged. In this manner it can be seen that another bit of information indicated by a ground level potential may also be shifted along from stage to stage of the shift register.

Figure 2:
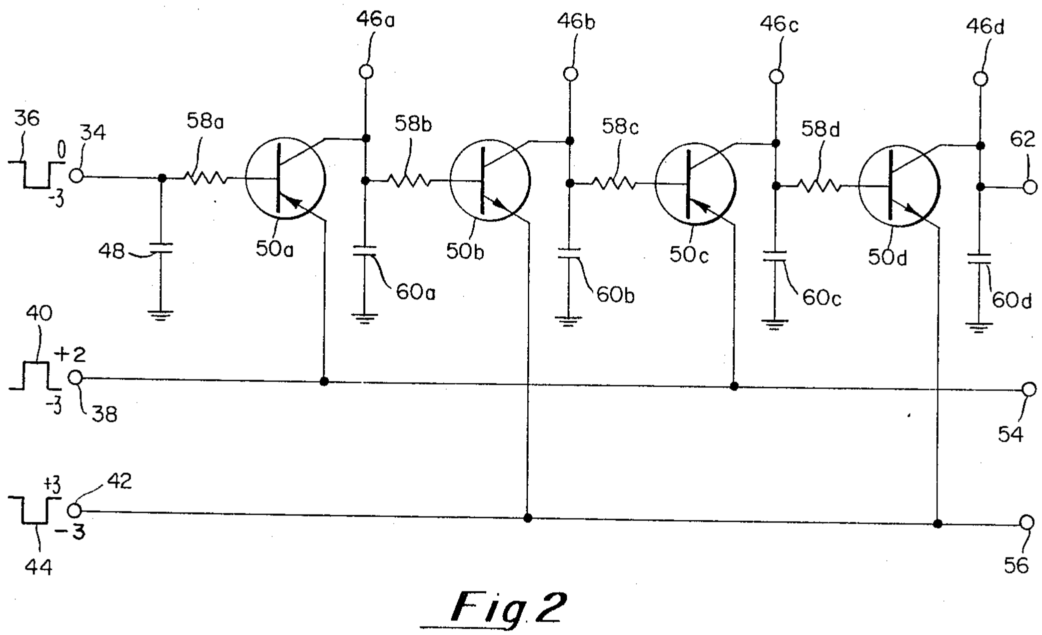
FIGURE 2 is a schematic circuit diagram of another embodiment of the invention.

In FIGURE 2, another embodiment of the invention is shown having a signal input terminal 34 for receiving negative input pulses 36, having a positive shift pulse input terminal 38 for receiving positive pulse voltages 40, having negative shift pulse terminal 42 for receiving negative shift pulse voltages 44, and having output terminals **46*a*, 46*b*, 46*c* and 46*d*. The signal input terminal 34 is electrically connected to one plate of a capacitor 48; the other plate of capacitor 48 is grounded. The positive shift pulse input terminal 38 is electrically connected to the emitters of the PNP transistors 50*a* and 50*c*, and also to the terminal 54; the negative shift pulse input terminal 42 is electrically connected to the emitter of NPN transistor 50*b*, to the emitter of NPN transistor 50*d*, and to terminal 56**.

A resistor **58*a* electrically connects the signal input terminal 34 to the base of transistor 50*a*. The collector of the transistor 50*a* is electrically connected to the output terminal 46*a*, to one end of the resistor 58*b*, and to one plate of the capacitor 60*a*; the other plate of capacitor 60*a*** is grounded.

The base of transistor **50*b* is electrically connected to the other end of the resistor 58*b*. The collector of the transistor 50*b* is electrically connected to the output terminal 46*b*, to one end of the resistor 58*c*, and to one plate of the capacitor 60*b*; the other plate of the capacitor 60*b*** is grounded.

The base of transistor **50*c* is electrically connected to the other end of the resistor 58*c*. The collector of the transistor 50*c* is electrically connected to the output terminal 46*c*, to one end of the resistor 58*d* and to one plate of the capacitor 60*c*; the other plate of capacitor 60*c*** is grounded.

The base of the transistor **50*d* is electrically connected to the other end of the resistor 58*d*. The collector of the transistor 50*d* is electrically connected to output terminal 46*d*, to terminal 62 and to one plate of the capacitor 60*d*; the other plate of capacitor 60*d* is grounded. Additional stages of the shift register may be electrically connected to the terminals 62, 54 and 56. Also, a ring counter may be formed by electrically connecting the terminal 62 to the terminal 34**.

A negative input pulse 36 applied to signal input terminal 34 charges capacitor 48. A positive shift voltage pulse 40 applied to terminal 38 causes current to flow between the emitter and base of the transistor **50*a* causing it to turn on so as to charge capacitor 60*a*. A positive output voltage now appears at the intermediate output terminal 46*a*. The negative shift voltage 44 applied to terminal 42 now draws current through the transistor 50*b* which conducts because of the positive voltage applied to its base from capacitor 60*a*. The current drawn through the transistor 50*b* charges the capacitor 60*b* to a negative level which may be measured from the output terminal 46*b*. The negative output at terminal 46*b* is the first stage of the counter. If another sequence of a positive shift pulse 40 and a negative shift pulse 44 is applied, the negative output voltage will be moved from terminal 46*b* to 46*d*** by the same process.

It can be seen that the shift register shown in FIGURE 2 operates in a manner similar to the shift register shown in FIGURE 1, but it does not require the Zener diodes. However, the advance pulses must come from two separate drivers electrically connected to terminals 38 and 42 respectively.

Both of the shift registers are inexpensive and capable of rapid operation. They are entirely solid state with the accompanying reliability and compactness.

Obviously, many modifications and variations of the present invention are possible in the light of the above teachings. It is therefore to be understood that within the scope of the appended claims the invention may be practiced otherwise than as specifically described.

What is claimed is:

1. The combination comprising:

an input terminal connected to receive input voltage pulses;

advance-terminal means connected to receive voltage pulses of a first polarity and a second polarity;

pulse energy storage means, electrically connected to said input terminal, for storing energy received in the form of a voltage pulse from said input terminal;

first switch means, having a first terminal electrically connected to said first energy storage means, having a second terminal, and having a control terminal electrically connected to said advance terminal means, for discharging the energy stored in said first energy storage means and for providing a voltage pulse to said second terminal only when receiving a voltage pulse of said first polarity from said advance terminal means on said control terminal;

second energy storage means, having an energy receiving terminal electrically connected to the second terminal of said first switch means, for storing energy received in the form of a voltage pulse from said second terminal;

second switch means, having an input terminal electrically connected to the energy receiving terminal of said second energy storage means independently of said second energy storage means, having an output terminal, and having a control terminal electrically connected to said advance terminal means, for discharging energy from said second energy storage means and for providing energy to said output terminal only when receiving a voltage pulse of said second polarity from said advance terminal means; and third energy storage means, electrically connected to the output terminal of said second switch means, for storing energy received in the form of a voltage pulse from said second switch means.

2. The combination according to claim 1 in which said first switch means is an NPN transistor connected to first voltage break-down means and said second switch means comprises a PNP transistor connected to second voltage break-down means.

3. The combination according to claim 2 in which said first, second and third energy storage means comprise capacitors.

4. The combination comprising:

an input terminal electrically coupled to receive signal input voltages;

an output terminal;

first energy storage means, electrically connected to said input terminal, for storing energy received in the form of voltage pulses from said input terminal;

second energy storage means, electrically connected to said output terminal, for storing energy in the form of a voltage;

advance terminal means for receiving voltages of a first polarity and voltages of a second polarity; and transfer means electrically connected to said advance terminal means comprising intermediate energy storage means having a signal receiving terminal, first polarity responsive switch means electrically coupled to said first energy storage means and to the signal receiving terminal of said intermediate energy storage means and second polarity responsive switch means electrically coupled to said second energy storage means and to the signal receiving terminal of said intermediate energy storage means independently of said intermediate energy storage means, for discharging said first energy storage means when receiving a voltage pulse of said first polarity from said advance terminal means and for providing energy to said second energy storage means when receiving a voltage pulse of said second polarity from said advance terminal means.

5. The combination according to claim 4 in which said first and said second energy storage means are capacitors.

6. The combination according to claim 5 in which said transfer means comprises:

a first Zener diode having its anode electrically connected to said first energy storage means;

a PNP transistor having its base electrically connected to the cathode of said first Zener diode and having it emitter electrically connected to said advance terminal means;

a capacitor having one plate electrically connected to the collector of said PNP transistor and having its other plate grounded;

a second Zener diode having its cathode electrically connected to the collector of said PNP transistor; and an NPN transistor having its base electrically connected to the anode of said second Zener diode, having its emitter electrically connected to said advance terminal means and having its collector electrically connected to said second energy storage means.

7. In a shift register the combination comprising:

an input terminal connected to receive voltage pulses;

a first Zener diode having its anode electrically connected to said input terminal;

a PNP transistor;

a first resistor electrically connected between the cathode of said first Zener diode and the base of said PNP transistor;

a first capacitor electrically connecting the collector of said PNP transistor to ground;

a second Zener diode having its cathode electrically connected to the collector of said PNP transistor;

an NPN transistor;

a second resistor electrically connected between the anode of said second Zener diode and the base of said NPN transistor;

an output terminal electrically connected to the collector of said NPN transistor;

a second capacitor electrically connecting the collector of said NPN transistor to ground; and an advance pulse terminal electrically connected to the emitter of said PNP transistor and to the emitter of said NPN transistor and connected to receive an alternating polarity advance signal.

8. In a shift register the combination comprising:

an input terminal connected to receive volage pulses;

a PNP transistor;

a first resistor electrically connecting said input terminal to the base of said PNP transistor;

a capacitor electrically connecting the collector of said PNP transistor to ground;

an NPN transistor;

a second resistor electrically connecting the collector of said PNP transistor to the base of said NPN transistor;

an output terminal electrically connected to the collector of said NPN transistor;

a second capacitor electrically connecting the collector of said NPN transistor to ground;

a first advance pulse terminal electrically connected to the emitter of said PNP transistor; and a second advance pulse terminal connected to receive negative advance pulses and electrically connected to the emitter of said NPN transistor.

References Cited by the Examiner

UNITED STATES PATENTS

| | | | |
|---|---|---|---|
| 2,820,153 | 1/1958 | Woll | 307—88.5 |
| 3,082,332 | 3/1963 | Smeltzer et al. | 307—88.5 |
| 3,119,031 | 1/1964 | Smeltzer et al. | 307—88.5 |
| 3,121,175 | 2/1964 | Vigneron | 307—88.5 |

ARTHUR GAUSS, *Primary Examiner.*

J. HEYMAN, J. ZAZWORSKY, *Assistant Examiners.*